(12) United States Patent
Misek (10) Patent No.: US 7,276,684 B2
(45) Date of Patent: Oct. 2, 2007

(54) HIGH GAIN PHOTO CELL WITH IMPROVED PULSED LIGHT OPERATION

(75) Inventor: Brian James Misek, Fort Collins, CO (US)

(73) Assignee: Avago Technologies General IP Pte Ltd, Singapore (SG)

( * ) Notice: Subject to any disclaimer, the term of this patent is extended or adjusted under 35 U.S.C. 154(b) by 264 days.

(21) Appl. No.: 10/463,502

(22) Filed: Jun. 16, 2003

(65) Prior Publication Data
US 2004/0251399 A1 Dec. 16, 2004

(51) Int. Cl.
*G01J 1/44* (2006.01)
*H01J 40/14* (2006.01)
*H03F 3/08* (2006.01)

(52) U.S. Cl. ............................. 250/214 R; 250/214 C; 250/208.2; 250/208.1; 327/514

(58) Field of Classification Search ............. 250/208.2, 250/214 C, 214 R, 208.1; 327/514
See application file for complete search history.

(56) References Cited

U.S. PATENT DOCUMENTS

| | | | | |
|---|---|---|---|---|
| 3,576,452 A * | 4/1971 | Smith | ........................... | 330/59 |
| 5,548,112 A * | 8/1996 | Nakase et al. | .......... | 250/214 C |
| 5,572,074 A * | 11/1996 | Standley | ..................... | 307/117 |
| 6,023,357 A * | 2/2000 | Miyasita | ..................... | 398/139 |
| 6,525,305 B2 * | 2/2003 | Deschamps et al. | .... | 250/214 R |
| 6,849,845 B2 * | 2/2005 | Lauffenberger et al. | ................... | 250/214 SW |
| 2003/0178552 A1 * | 9/2003 | Hofmeister et al. | .... | 250/214 R |

\* cited by examiner

*Primary Examiner*—Georgia Epps
*Assistant Examiner*—Patrick J. Lee (57) ABSTRACT

A photocell system includes a current control circuit that provides an offset voltage. Each photocell in a photocell array includes an opto-electrical converter receives the offset voltage such that the opto-electrical converter establishes a DC operating point. In one embodiment, each photocell includes the current control circuit. In an alternate embodiment, a single current control circuit provides the offset voltage for the entire photocell array.

20 Claims, 6 Drawing Sheets

CAP VOLTAGE WITH PULSED AND NON PULSED LIGHT

HIGH GAIN PHOTO CELL WITH IMPROVED PULSED LIGHT OPERATION

BACKGROUND

Figure 1:
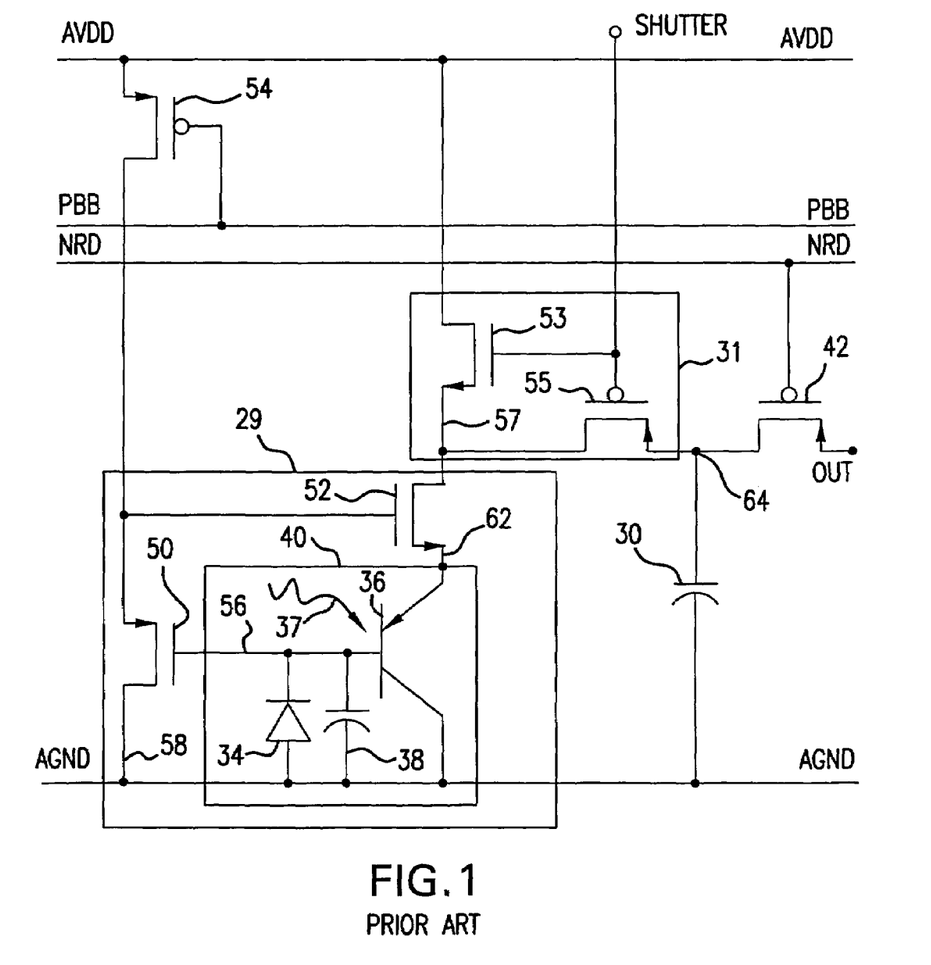
FIG. 1 illustrates a photocell of the prior art.

High gain photo cells based on the work of Baumgartner, et al. in U.S. Pat. No. 5,769,384, "Low differential light level photoreceptors", and improved by Knee, et al. in U.S. Pat. No. 6,104,020, "Electronic shutter for a low differential light level photo-receiver cell", both assigned to Agilent Technologies, Inc., have been extensively used in the area of optical navigation. The photocells have an optically biased PNP bipolar transistor that serves as both the light to current converter as well as the first gain stage in the signal processing system. FIG. 1 illustrates a prior art photocell. The PNP transistor 40 is shown with the parasitic base-collector capacitor 38 formed by the reversed bias base-collector diode 34.

Figure 2:
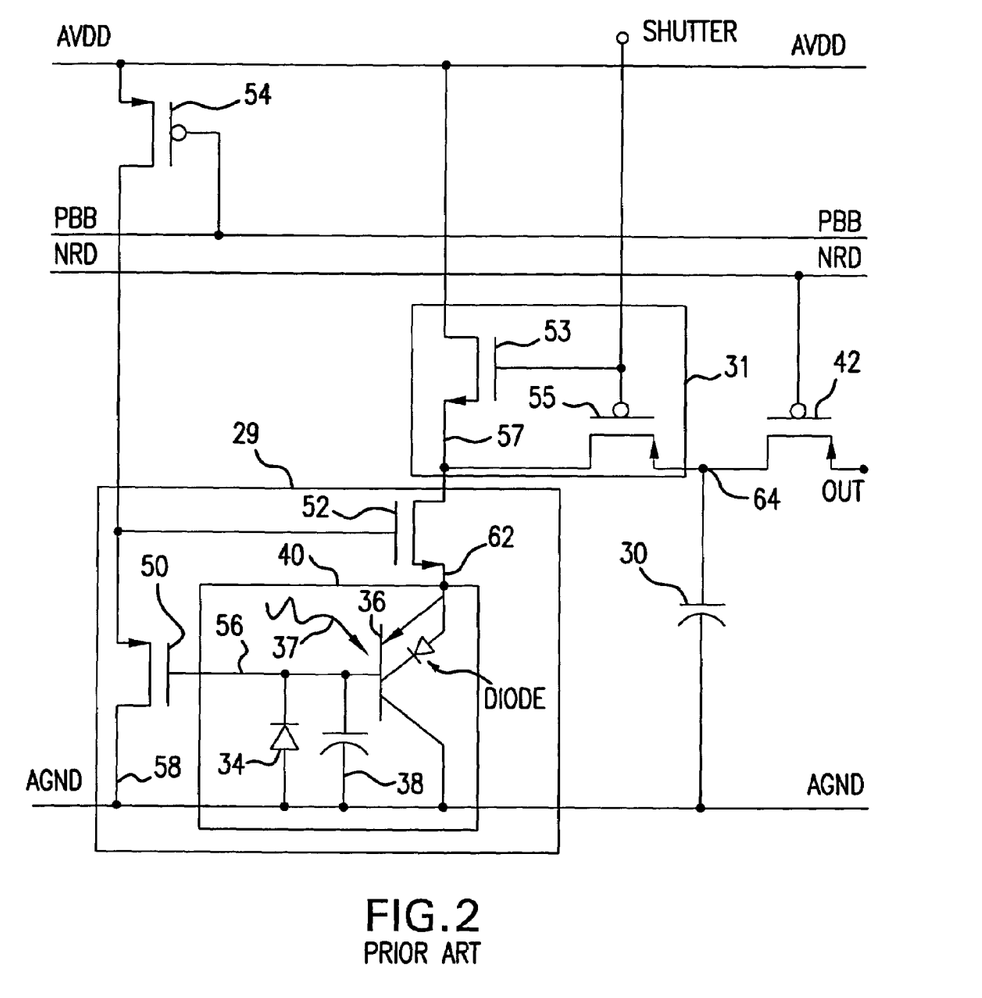
FIG. 2 illustrates an emitter-based diode of the prior art.

FIG. 2 (prior art) illustrates an emitter-base diode that must be forward biased to place the transistor in the forward active region. When light is sensed, there is a large DC component and a small AC component that establishes the operating point of the transistor. The AC component modulates the current in the emitter due to the high current gain at this operating point. The disadvantage of this circuit for pulsed light operation is that the signal current is consumed in reestablishing the forward bias on the base-emitter diode and is not available for integration on the signal capacitor 30 until the operating point of the PNP in the forward region is reestablished. The only current available to re-bias the transistor is the optically generated current corresponding to the input signal.

Figure 3:
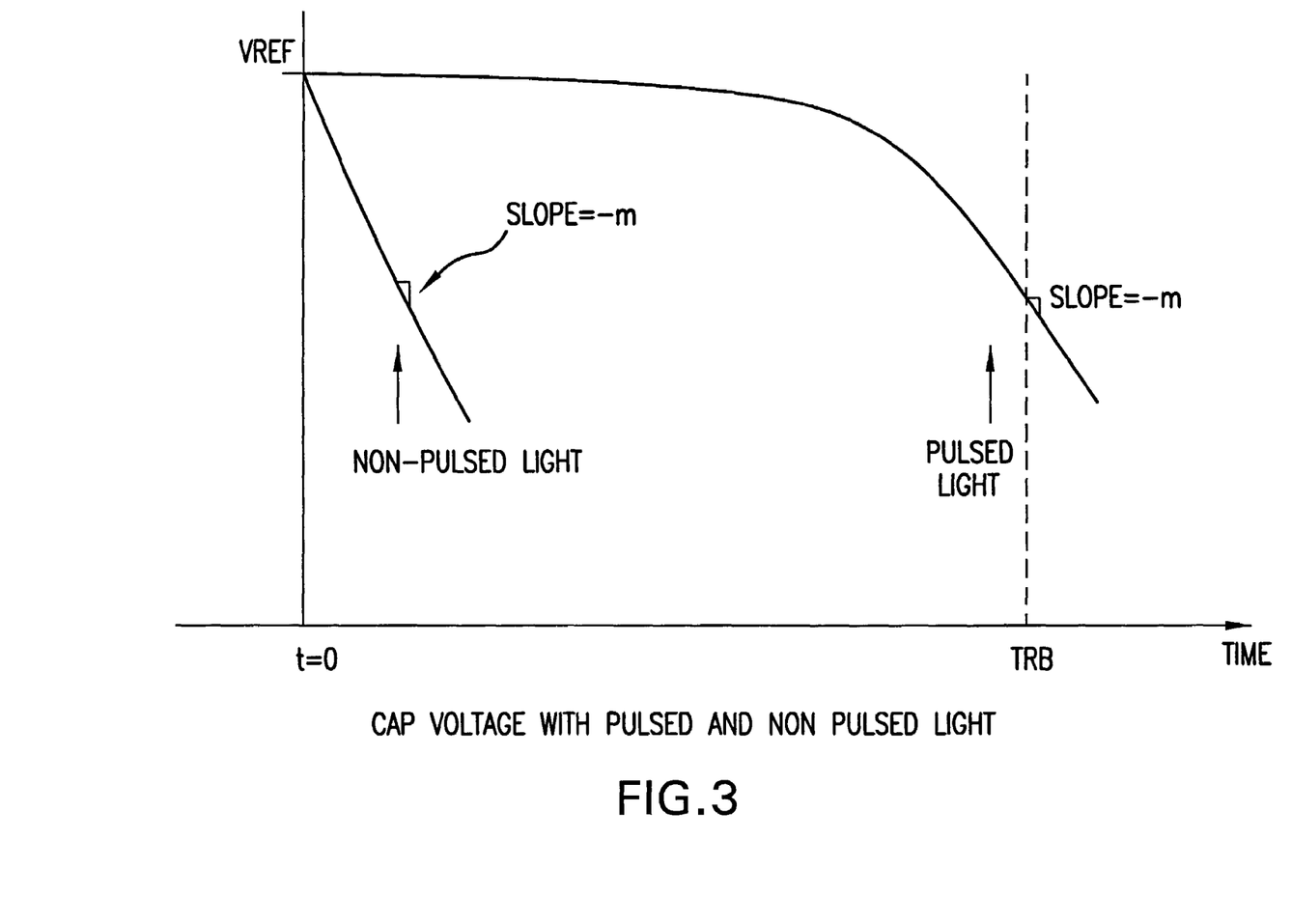
FIG. 3 shows the integrated voltage on a capacitor versus time for DC and pulsed light conditions.

FIG. 3 present the integrated voltage on capacitor 30 versus time for DC and pulsed light conditions. Assuming an initial DC voltage on the capacitor 30 of Vref. For the DC case, there is a linear ramp down in time. For the pulsed case, there is a time $T_{rb}$ that is needed to rebias the transistor before the slope on the discharge rate is the same as the DC slope. During $T_{rb}$, the current generated from the input signal is used to rebias the PNP transistor 40 and is not available for processing by the downstream circuitry. The amount of charge that is needed to rebias the PNP transistor 40 back to its operating point is to the first order constant. Therefore, the time Trb is inversely proportional to the signal current generated in the base. In an application, e.g. optical mouse, the light is provided by driving a light emitting diode (LED) to illuminate the surface. The need to preflash the LED to reestablish the bias point is a large power consuming function. In battery application, this is a major limitation on the time between battery replacements.

SUMMARY

The present invention improves the pulsed light response of PNP transistor based photodetector by keeping the DC operating point established when no light is present. This is achieved by placing a current source from the base node of the PNP during but not limited to periods of no light thereby keeping the transistor in the forward bias region.

A photocell system includes a current control circuit that provides an bias voltage. Each photocell in a photocell array includes an opto-electrical converter receives the bias voltage such that the opto-electrical converter establishes a DC operating point. In one embodiment, each photocell includes the current control circuit. In an alternate embodiment, a single current control circuit provides the bias voltage for the entire photocell array.

DETAILED DESCRIPTION

The present invention improves the pulsed light response of high gain pixels in with reduced image degradation and with greater energy efficiency as compared to utilizing the light to rebias the pixels. This improved PNP based photodetector has the DC operating point maintained when no light is present. This is achieved by placing a current source from the base node to AGND when the light is off. The magnitude of the current source should be close to the magnitude of the base current that flows when the photocell has optical stimulus to minimize the readjustment period.

Figure 4:
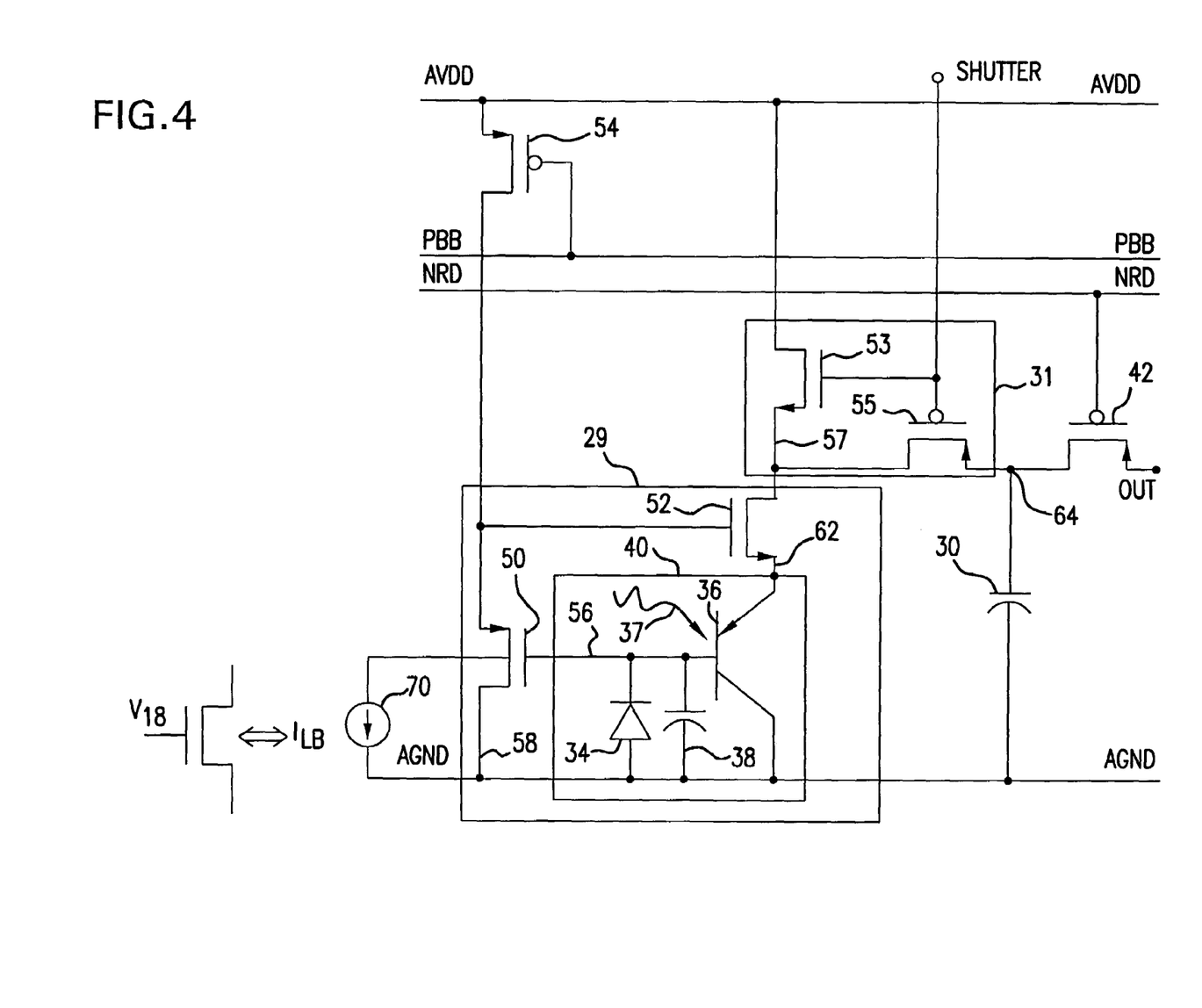
FIG. 4 illustrates a block diagram of a photoelement circuit according to the present invention.

FIG. 4 illustrates a block diagram of a photoelement circuit according to the present invention. Incoming light 37 is converted into a current that is integrated during a sample period. The stored value is periodically read out, so that it is available for a next step in a processing sequence. At the start of an integration cycle, photocurrent that is generated by means of a photodiode 34 is amplified by a PNP transistor 36. The photodiode and the transistor, along with a parasitic capacitance 38, define a photoelement 40. The amplified photocurrent discharges the integration capacitor 30 downwardly. This change in voltage on the capacitor 30 represents the charge that will be processed by the later stages of circuitry.

The photodiode 34 of the photoelement 40 generates a current in response to reception of light photons. The photodiode is connected to the base of the PNP transistor 36. The reverse bias diode capacitance 38 is a parasitic capacitance that is quite large for large area collectors. The optical signal illuminating the photodiode causes a small current, for example about 0.1 nA, in the diode current source. Because of the low current level, amplification is needed to ensure that the optical variation signal, which is only approximately six percent of the constant photocurrent, will create sufficient voltage differences to be distinguished from noise.

The PNP transistor 36 of the photoelement 40 amplifies the photocurrent. The amplification provided by the transistor allows use of an integration capacitor 30 that facilitates reproducibility from photoelement to photoelement. In the absence of amplification, the low current from the photodiode 34 would require a very small capacitor as an integrator in order to get a 1 volt swing, e.g. 10 pF. Because of the parasitics, this would be difficult to reproduce on an element-to-element basis. Changing the photoelement layout from a diode to a substrate PNP device is a convenient way of providing current amplification. A beta value of nineteen increases the output emitter current to 2 nA. Thus, an integration capacitor of 0.20 pF can be used. This facilitates reproducibility, but is not so large as to require excessive area.

The present invention places a current source 70 from the base node of MOS transistor 50 to AGND. The magnitude of the current source is close to the magnitude of the base current that flows when the photocell has stimulus. This current source can be realized by a NFET with a gate voltage of Vlb. This "holding" current allows the base-emitter junction of the PNP transistor 36 to maintain a DC operating point without the need to use light.

When the light signal is present, the current source 70 can be switched off by pulling Vlb to GND, so that the signal that is integrated on the capacitor 30 is only based on the actual light signal and not the holding current. Alternatively, the current source 70 can be kept on and holding current component of the signal integrated on the capacitor 30 is treated as a DC offset.

A servo circuit 29 is formed by MOS transistors 50 and 52. The MOS transistors form a bias point amplifier with a common gate stage for the output of the phototransistor 36. MOS transistor 54 supplies the bias current via analog power supply line AVDD when the proper signal is received from bias voltage line PBB. To achieve proper transfer of the current generated in the photoelement 40 to the integration capacitor 30, the photodiode reverse voltage (i.e., the transistor base voltage) must be kept at a substantially constant level. If the voltage at the base node 56 were to be allowed to shift, the photocurrent would be at least partially consumed in charging and discharging the diode capacitance 38, rather than providing current to be amplified by the substrate PNP transistor 36. The need to keep the base node fixed is the reason that a switchable current source was chosen to keep the PNP transistor 34 biased during no light. The high impedence of the current source allows this device to be present and not disturb the base node.

The transistor base voltage at the node 56 is kept at a substantially fixed level by the three MOS transistors 50, 52 and 54. While not critical to achieving the desired operation, in the embodiment of FIG. 4, the substantially fixed voltage level is approximately equal to the NMOS threshold level above AVDD at the collector node 58. The MOS transistors operate as a negative feedback loop by means of transistor 52 operating as a source follower to the emitter node 62 of the PNP transistor 36. Thus, the base voltage is controlled by the emitter voltage of the transistor. This is possible because the base voltage, i.e. the photodiode output, has a very high DC impedance level. The bias technique of emitter control operated effectively during testing. From the output perspective, transistor 52 is a common gate stage that has an added advantage of providing additional isolation of the emitter node 62 and the base node 56 of the transistor from the voltage swing of a node 64.

The electronic shutter 31 is formed from NMOS transistor 53 and PMOS transistor 55. When a signal from input node SHUTTER is at a logic low, transistor 55 is in a conducting mode and transistor 53 is in a non-conducting mode. In this state, the servo circuit continues to discharge the integration capacitor 30. In this mode, electronic shutter circuit 31 is in an "open" mode. When a high logic signal is received from node SHUTTER, then transistor 53 is in a conducting mode and transistor 55 is in a non-conducting mode. In this state the photo-generated emitter current from photoelement 40 is diverted for the integration capacitor 30 to the power supply line AVDD. In this mode, electronic shutter circuit 31 is in a closed mode and integration capacitor 30 is not integrating any photo-generated charge. Thus, to end an integration period, electronic shutter circuit configured into a "closed" mode. During the closed mode integration capacitor 30 holds its charge until it is read. In this period the light signal can be removed and the bias current is maintained by the current source 70.

At the end of a read period, a read switch 42 is turned "on" via a logic signal from line NRD to output the charge stored on the integration capacitor 30 to a transfer amplifier (not shown) via node OUT. The read switch may be a PMOS transistor that is controlled by a read control line NRD. In this manner, integration capacitor 30 holds its charge until it is read after the shutter circuit is in a closed mode until it is read via read transistor 42. The operation of the transfer amplifier (not shown) pulls the node 64 back to the reset voltage. This accomplishes the transfer of the charge signal to transfer amplifier circuitry (not shown). At the conclusion of the transfer process, the read control line NRD is caused to return to a logic low and transistor 42 returns to a non-conducting state.

Figure 5:
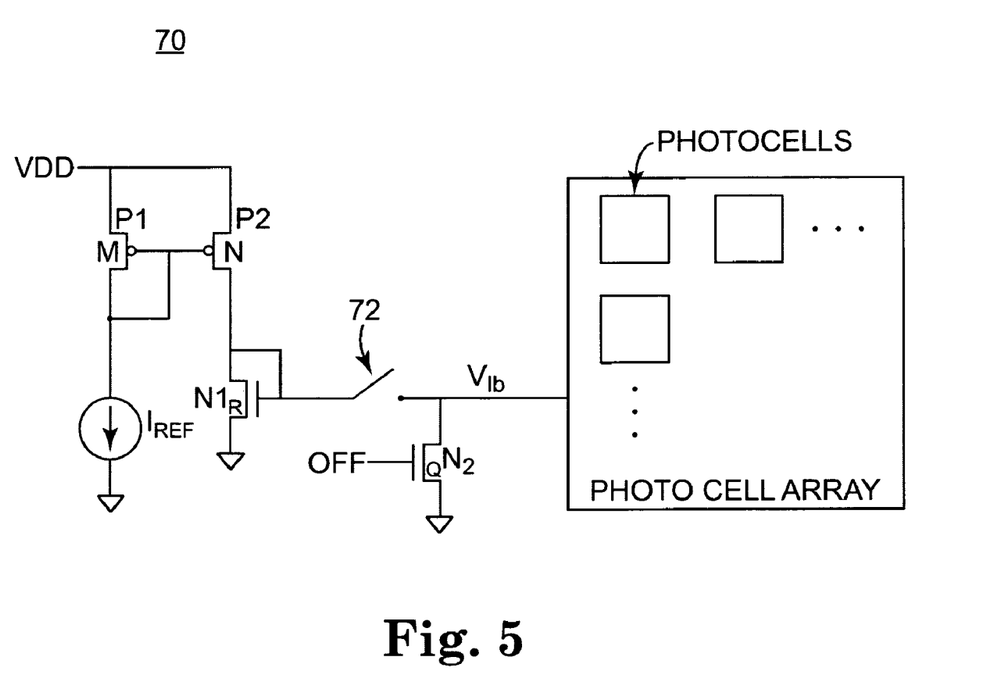
FIG. 5 illustrates a schematic diagram of the current source shown in FIG. 4.

FIG. 5 illustrates a schematic diagram of the current source 70 shown in FIG. 4. The current source 70 gate node includes an optical switching feature. As illustrated in FIG. 5, this current source provides a global solution/control for an array of photocells.

A first current mirror is formed by FETs P1 and P2. FET P1 has a width of M while FET P2 has a width of N. The first current mirror connects between the positive supply rail VDD and a current source $I_{ref}$. The current source $I_{ref}$ is further connected to GND. A second current mirror is formed by FETs N1 and N2. FET N1 has a width of R while FET N2 has a width of Q. The second current mirror connects to the drain of FET P2 in the $1^{st}$ mirror and GND. The source of FET N2 provides the global bias voltage Vlb to the photocell array. The optional switch 72 while shown within the second current mirror could be placed anywhere within the current path.

The current mirrors defined by P1:P2 and N1:N2 need not have a 1:1 ratio. The devices P1:P2 and N1:N2 form a current multiplier of $Iref*(N*Q)/(M*R)$. The sample switch is optional depending on the mode of operation, e.g., switched or constant.

In this implementation the current $I_{lb}$ based on a DC $I_{ref}$ is not tied to an optical input. The current may be fixed or programmable. The current source $I_{ref}$ may be adjusted via digital hardware (not shown) based on images and algorithms to optimize the type of response desired from the array. Alternatively, the current source $I_{ref}$ could be generated from an optical detector, e.g. a single diode detector in or near the array or from multiple detectors that are averaged together to get the average light level seen by the array.

Figure 6:
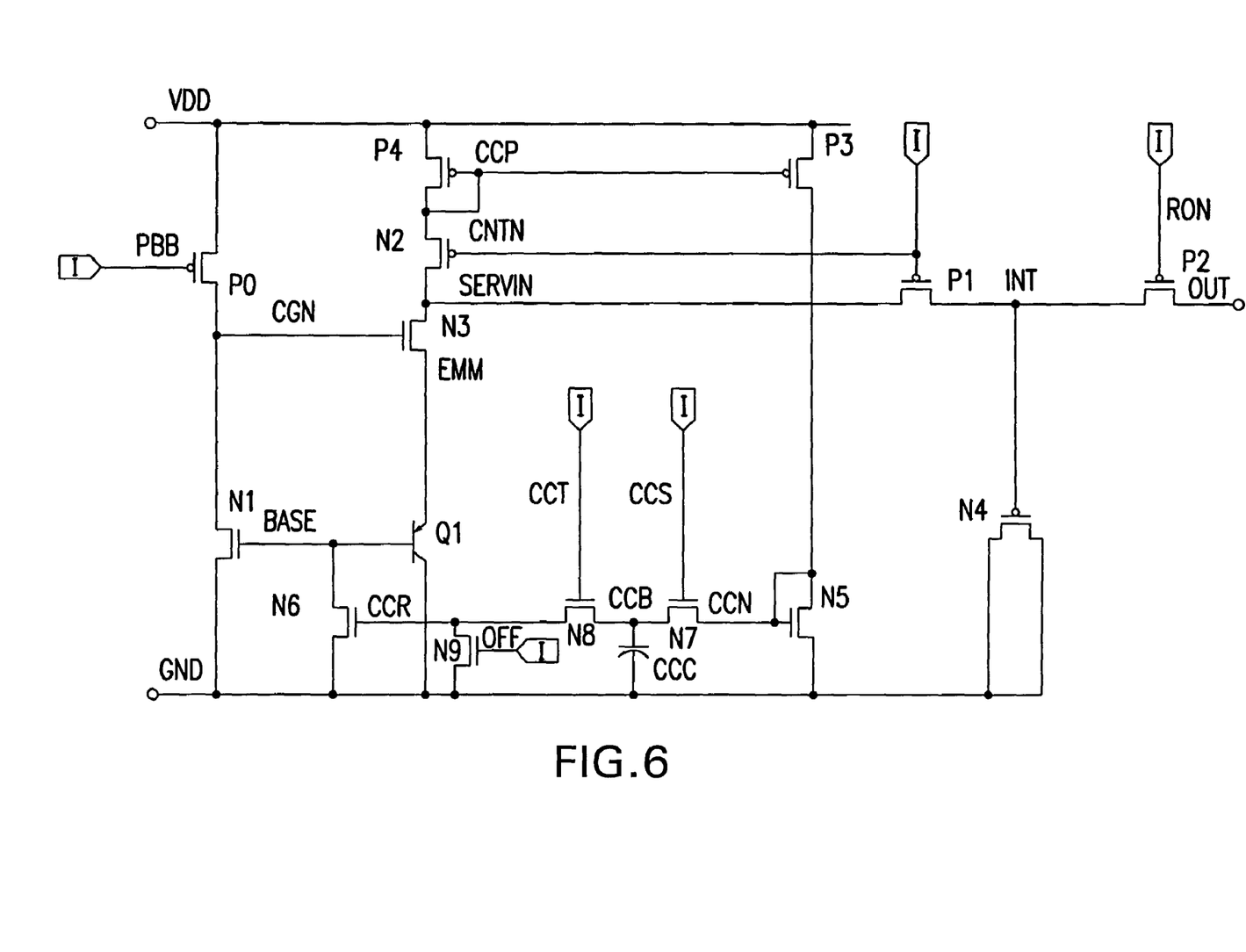
FIG. 6 illustrates another schematic diagram of the current source shown in FIG. 4.

FIG. 6 illustrates an alternate embodiment for the present invention. In this embodiment, the current source is integrated into the individual photocell. This allows each DC operating point to be based on the last optical operating point for each pixel.

In operation, the current through the PNP Q1 is sensed via the PMOS mirror P4:P3 and voltage on node CCN is sampled and held via N7 onto node CCB. When the light is removed, the current source N6 is turned on by transferring the sampled voltage on CCB to node CCa after N9 is turned off. This allows the base node to remain biased to a base current of emitter current during sampling divided by the ratio of the mirrors P4:P3 and N5:N6. The sample and hold circuit formed by N7, N8, and CCC is to keep the circuit from going into a positive feedback mode and locking to the rail.

The invention claimed is:

1. A non-preflash pulsed light emission and photodetector system, comprising:
    a photocell circuit comprising at least one photodiode and at least one transistor configured to provide an output signal, the photodiode being connected to the transistor at least one current source circuit configured to provide a holding current to the transistor, and at least one light-emitting diode ("LED") configured to provide light to the photodiode and to be driven according to the output signal provided by the transistor;

wherein the current source circuit is configured to be switched off when the photodiode is stimulated by light emitted by the LED, the photodiode being configured to generate a photocurrent when light emitted by the LED is incident thereon, the transistor being configured to amplify the photocurrent to provide an amplified photostimulus current as the output signal therefrom, the current source circuit being configured to be switched on when the LED is not emitting light and the photodiode is not being stimulated thereby to provide a holding current to the transistor to maintain a substantially constant DC operating point voltage in the transistor when no amplified photostimulus current is being generated by the transistor in response to the photodiode not generating the photocurrent.

2. The pulsed light emission and photodetector system of claim 1, wherein the system is further configured to provide the amplified photostimulus current and the holding current of substantially the same magnitude.

3. The pulsed light emission and photodetector system of claim 1, wherein the transistor is a PNP transistor and the system is configured to provide the holding current to a base-emitter junction of the transistor.

4. The pulsed light emission and photodetector system of claim 1, wherein the system is further configured to provide an amplified photostimulus current that causes a change in voltage of an integration capacitor.

5. The pulsed light emission and photodetector system of claim 1, wherein the photocell circuit further comprises a reverse bias diode capacitance element arranged in parallel with the photodiode.

6. The pulsed light emission and photodetector system of claim 1, wherein the current source circuit comprises at least one NFET.

7. The pulsed light emission and photodetector system of claim 1, wherein the transistor is a PNP transistor and the photocell circuit and current source circuit are configured to provide the substantially constant DC operating point voltage to a base of the transistor.

8. The pulsed light emission and photodetector system of claim 1, wherein the transistor is a PNP transistor and the photocell circuit and current source circuit are configured to provide a substantially constant DC operating point voltage to a emitter junction of the transistor.

9. The pulsed light emission and photodetector system of claim 1, wherein the photocell circuit is incorporated into a servo circuit.

10. The pulsed light emission and photodetector system of claim 9, wherein the servo circuit comprises a plurality of MOS transistors configured to provide a substantially constant voltage to a base of the transistor.

11. The pulsed light emission and photodetector system of claim 1, wherein the system further comprises an electronic shutter connected to an output of the photocell circuit and operable to be configured in closed and open modes.

12. The pulsed light emission and photodetector system of claim 1, wherein the system further comprises a plurality of photocell circuits.

13. The pulsed light emission and photodetector system of claim 12, wherein the system further comprises a plurality of current source circuits.

14. A non-preflash method of maintaining a substantially constant DC operating point voltage in at least one transistor in a light emission and photodetector system, the system comprising a photocell circuit, at least one current source circuit and at least one light emitting diode ("LED"), the photocell circuit comprising at least one photodiode connected to the transistor, the current source circuit being configured to provide a holding current to the transistor, the LED being configured to provide light to the photodiode and be driven according to an output signal provided by the transistor, the photocell circuit being configured to generate a photocurrent through the photodiode when the photodiode is stimulated by light emitted by LED being incident thereon and not to generate the photocurrent when the LED is not emitting light, the current source circuit being configured to be switched on and provide the holding current to the transistor when the photocurrent is not being provided to the transistor by the photodiode, the current source circuit further being configured to be switched off when the photodiode is stimulated by light emitted by the LED and a photocurrent is generated thereby and provided to the transistor, the transistor being configured to amplify the photocurrent to provide an amplified photostimulus current to the LED as the output signal therefrom, the current source circuit further being configured to provide the holding current to the transistor to maintain the substantially constant DC operating point voltage in the transistor when no amplified photostimulus current is being generated by the transistor in response to the photodiode not being stimulated by light being incident thereon the method comprising:

providing the holding current to the transistor when the LED is not emitting light and the photodiode is not being stimulated thereby.

15. The method of claim 14, further comprising providing the amplified photostimulus current to the transistor when the photodiode is stimulated by light emitted by the LED and generates the photocurrent in response thereto.

16. The method of claim 14, further comprising providing the amplified photostimulus current of a first magnitude and the holding current of a second magnitude, the first and second currents being of substantially the same magnitude.

17. The method of claim 14, further comprising providing the holding current to a base-emitter junction of the transistor.

18. The method of claim 14, further comprising the amplified photostimulus current causing a change in voltage of an integration capacitor.

19. The method of claim 14, further comprising providing a substantially constant DC operating point voltage to a base of the transistor.

20. The method of claim 14, further comprising providing a substantially constant DC operating point voltage to a base-emitter junction of the transistor.

* * * * *

UNITED STATES PATENT AND TRADEMARK OFFICE
CERTIFICATE OF CORRECTION

PATENT NO.        : 7,276,684 B2
APPLICATION NO. : 10/463502
DATED             : October 2, 2007
INVENTOR(S)       : Brian J Misek Page 1 of 1

It is certified that error appears in the above-identified patent and that said Letters Patent is hereby corrected as shown below:

Col. 5, Line 49 in Claim 8, delete "emitter" and insert --base-emitter--, therefor.

Col. 6, Line 35 in Claim 14, delete "thereon" and insert --thereon,--, therefor.

Signed and Sealed this

Thirtieth Day of June, 2009

JOHN DOLL
*Acting Director of the United States Patent and Trademark Office*